US008195761B2

(12) United States Patent
Carlson et al.

(10) Patent No.: US 8,195,761 B2
(45) Date of Patent: Jun. 5, 2012

(54) PREFETCHING WEB RESOURCES BASED ON PROXY TRIGGERS

(75) Inventors: Michael Pierre Carlson, Austin, TX (US); Srinivas Chowdhury, Temple, TX (US)

(73) Assignee: International Business Machines Corporation, Armonk, NY (US)

( * ) Notice: Subject to any disclaimer, the term of this patent is extended or adjusted under 35 U.S.C. 154(b) by 2839 days.

(21) Appl. No.: 10/756,133

(22) Filed: Jan. 13, 2004

(65) Prior Publication Data

US 2005/0198191 A1     Sep. 8, 2005

(51) Int. Cl.
*G06F 15/16*     (2006.01)
(52) U.S. Cl. ...................... 709/217; 370/352
(58) Field of Classification Search .................. 709/203, 709/217; 370/352
See application file for complete search history.

(56) References Cited

U.S. PATENT DOCUMENTS

| | | | |
|---|---|---|---|
| 5,809,566 A | 9/1998 | Charney et al. | 711/213 |
| 5,918,013 A * | 6/1999 | Mighdoll et al. | 709/217 |
| 6,067,565 A * | 5/2000 | Horvitz | 709/218 |
| 6,185,608 B1 | 2/2001 | Hon et al. | 709/216 |
| 6,256,712 B1 | 7/2001 | Challenger et al. | 711/141 |
| 6,560,639 B1 | 5/2003 | Dan et al. | 709/218 |
| 6,598,048 B2 * | 7/2003 | Carneal et al. | 707/10 |
| 6,622,168 B1 * | 9/2003 | Datta | 709/219 |
| 6,993,591 B1 * | 1/2006 | Klemm | 709/232 |
| 7,113,935 B2 * | 9/2006 | Saxena | 707/2 |
| 7,136,875 B2 * | 11/2006 | Anderson et al. | 707/104.1 |
| 7,231,606 B2 * | 6/2007 | Miller et al. | 715/738 |
| 2002/0184364 A1 * | 12/2002 | Brebner | 709/224 |
| 2003/0195940 A1 * | 10/2003 | Basu et al. | 709/213 |

OTHER PUBLICATIONS

Challenger et al. A Scalable and Highly Available System for Serving Dynamic Data at Frequently Accessed Web Sites. In Proceedings of ACM/IEEE SC98, Nov. 1998.*
Challenger et al. disclose A Publishing System for Efficiently Creating Dynamic Web Content. INFOCOM 2000. Proceedings of IEEE 2000.*

* cited by examiner

*Primary Examiner* — Don Wong
*Assistant Examiner* — Tuan-Khanh Phan
(74) *Attorney, Agent, or Firm* — Yee & Associates, P.C.; Mark C. Vallone

(57) ABSTRACT

Web pages are prefetched upon activation of one of three server-side triggers: a service trigger, an access based trigger, and a timed trigger. The service trigger is a subscription service in which the web server agrees to notify the proxy when webpages in the web server are modified. The access based trigger uses logs/metrics to analyze a plurality of users' browsing habits. When the log/metrics database noticeS that a particular webpage experiences heavy requesting traffic during a particular time period, the log/metric creates an access based trigger to prefetch the requested webpage. The timed trigger is a prefetching mechanism that occurs on a regular interval. Configuration data instructs the timed trigger to prefetch a certain webpage a certain times throughout the day.

3 Claims, 3 Drawing Sheets

PREFETCHING WEB RESOURCES BASED ON PROXY TRIGGERS

The present invention is related to the subject matter of U.S. patent application Ser. No. 10/756,106, incorporated herein by reference.

FIELD OF THE INVENTION

The present invention is directed generally to a method for improving the rate of loading webpages to a user's computer and specifically at a method for determining which webpages to prefetch when using a prefetching mechanism.

BACKGROUND OF THE INVENTION

The World Wide Web (web) is one of the most popular mediums for obtaining information. The increasing popularity of the web has resulted in significant growth in the number of web users and thus an increase in web traffic. The increased traffic causes an increase in the time required for a user to request and receive a webpage. Other causes for increases in the time required for a user to request and receive a webpage are network congestion, low bandwidth, bandwidth underutilization, and propagation delay.

Web development engineers have created hardware solutions in an effort to decrease the time required to request and receive a webpage. One example of a hardware solution is an upgrade for the web servers and bandwidth capabilities. Another hardware solution is the use of a proxy between the user and the web server. In the proxy solution, the proxy has a cache memory for storing webpages that the user frequently visits. The time required to load a webpage from the proxy is significantly less than the time required to load a webpage from the web server. If the proxy does not have the webpage stored in cache memory, then the proxy passes the webpage request onto the web server, and then forwards the user-requested webpage back to the user.

Web development engineers have also developed software solutions in an effort to decrease the time required to request and receive a webpage. One of the software solutions is the concept of prefetching webpages. Prefetching is the process of obtaining webpages from the web server that the user has not yet requested. The main idea in prefetching is to prefetch those webpages that the user will most likely request. The prefetching is preformed during the downtime in the bandwidth, i.e. when the user is not requesting or receiving any webpages.

Many of the prior art versions of prefetching are inefficient in terms of bandwidth consumed and accurately perfecting webpages that the user actually requests. For example, when using a typical web search engine, a user enters search criteria and the search engine displays the ten most relevant responses to the search. The search engine also displays a "next" tag that leads the user to the next ten most relevant responses, and so forth. In some embodiments, after the search engine displays the first ten results, the web browser prefetches the webpages for the displayed links and stores the prefetched webpages in the user's computer. In other embodiments, when the user enters a search, the web browser prefetches the webpages for the links that will be displayed by clicking the "next" link and stores the prefetched webpages in the user's computer. Other embodiments exist where the user can configure the prefetching mechanism to prefetch only specific webpages.

One of the problems associated with the prior art prefetch mechanisms is that the criteria for selecting the particular webpages to prefetch is not very accurate in terms of selecting webpages that the user actually requests. The prior art prefetch mechanisms are also not very bandwidth efficient because a multitude of webpages that are never requested are transmitted to the user's computer. Another problem associated with the prior art prefetch mechanisms is that they must be configured by the user and the configuration process is time consuming and confusing to inexperienced users. Therefore, a need exists for a more bandwidth efficient prefetching mechanism that more accurately prefetches webpages that the user will likely request and that does not have to be configured by the user.

The prior art has previously addressed the issue of creating improved prefetching mechanisms. For example, U.S. Pat. No. 6,256,712 (the '712 patent) entitled "Scaleable Method for Maintaining and Making Consistent Updates to Caches" discloses a method for caching dynamic webpages. The method in the '712 patent updates webpages based on triggers in the webpages. However, the '712 invention is unable to prefetch webpages that do not contain the triggers. What is needed beyond the '712 patent is a method for prefetching webpages that is able to prefetch webpages that do not contain the triggers.

U.S. Pat. No. 6,560,639 (the '639 patent) entitled "System for Web Content Management Based on Server-Side Application" discloses a method for monitoring user changes to webpages. The method in the '639 patent allows a user to make changes to their personal webpages and monitor the status of their changes. What is needed beyond the '639 patent is a server-side method for monitoring changes made to webpages by people other than the user and to webpages other than the user's webpages.

Consequently, a need still exists for an improved prefetch mechanism that runs on the server side of the web and uses the users' browsing habits to determine the webpages to prefetch. The need extends to a prefetch mechanism that updates changed webpages other than the users' webpages. Finally, a need exists for a prefetch mechanism that update webpages that are altered by programs or people other than the user.

SUMMARY OF THE INVENTION

The present invention, which meets the needs identified above, is a method and system for decreasing the time required for a user to request and receive a webpage. The present invention divides the webpages in the proxy cache memory into two categories: user-requested webpages and prefetched webpages. User-requested webpages are webpages that a user requests from the proxy and that the proxy sends back to the user. Prefetched webpages are webpages that the user has not requested. The proxy obtains the prefetched webpages from the web server and stores the prefetched webpages in cache memory even though the user has not requested the prefetched webpage. The time required for the user to receive a user-requested webpage is substantially reduced when the user-requested webpage is a prefetched webpage.

The software embodiment of the present invention comprises a Browser Program (BP) operating on a user's computer, a Proxy Caching Program (PCP) and a Proxy Prefetching Program (PPP) operating on a proxy, and a Web Server Program (WSP) operating on a web server. The BP requests webpages from the proxy and receives webpages from the proxy. The PCP receives requests from the user, requests webpages from the web server, receives webpages from the web sever, caches the webpages, and forwards the webpages back to the user. The proxy may be located on the user's computer or on the server side of the World Wide Web. The WSP receives the requests from the proxy, obtains the webpages, and issues the webpages back to the proxy.

The PPP controls the prefetching mechanism in the proxy. The PPP prefetches webpages upon activation of one of three triggers: a service trigger, an access based trigger, and a timed trigger. The service trigger is a subscription service in which the web server agrees to notify the proxy when webpages in the web server are modified. The proxy stores the webpages in cache memory and updates the webpages whenever the web server sends a change notice to the proxy. The access based trigger uses a log/metrics database to analyze a plurality of users' browsing habits. When the log/metrics database notices that a particular webpage experiences heavy requesting traffic during a particular time period, the log/metrics database creates an access based trigger to prefetch the requested webpage. The timed trigger is a prefetching mechanism that occurs on at regular interval. Configuration data instructs the timed trigger to prefetch a certain webpage a certain times throughout the day. All three triggers operate as part of the PCP on the server side of the World Wide Web, such that the user is unaware of their existence. The use of the triggers enables the present invention to upload requested webpages to the user faster than the prior art methods.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
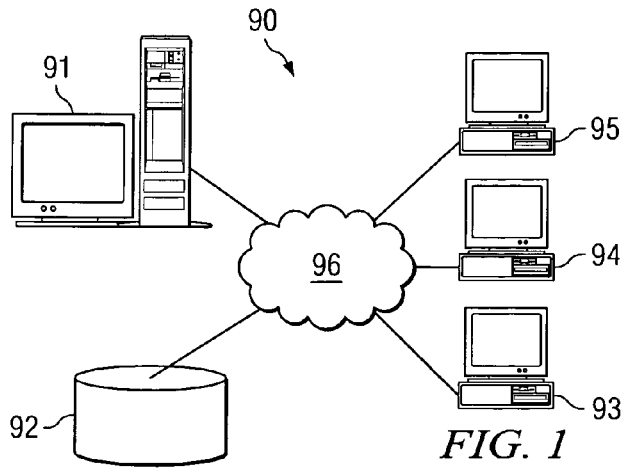
FIG. 1 is an illustration of a computer network used to implement the present invention.

As used herein, the term "access based trigger" shall mean a prefetch trigger, activated by a log/metrics database, which prefetches the webpage identified in the log/metrics database.

As used herein, the term "browser" shall mean a computer program for browsing the World Wide Web.

As used herein, the term "change notice" shall mean a notice sent from a web server to a proxy identifying a webpage that has been modified or changed.

As used herein, the term "computer" shall mean a machine having a processor, a memory, and an operating system, capable of interaction with a user or other computer, and shall include without limitation desktop computers, notebook computers, personal digital assistants (PDAs), servers, hand-held computers, and similar devices.

As used herein the term "configuration data" shall mean a computer file or database that specifies a timing interval and a webpage to prefetch upon the occurrence of the timing interval.

As used herein, the term "log/metrics database" shall mean a database and algorithm for analyzing the browsing habits of a plurality of users and determining which webpages need to be prefetched and the time for prefetching the webpages that need to be prefetched.

As used herein, the term "prefetch" shall mean to obtain a prefetched webpage and store the prefetched webpage in cache memory in the proxy or in the cache memory of a user's computer.

As used herein, the term "prefetched webpage" shall mean a webpage that a user has not requested but that the proxy or the browser still obtains and stores in cache memory.

As used herein, the term "proxy" shall mean a computer program that acts as an intermediary between the user's computer and a web server and that stores webpages in cache memory for access by a user. The proxy may be located on a user's computer or on the server side of the World Wide Web.

As used herein, the term "request" shall mean a computer instruction issued from a first computer to a second computer asking that the second computer deliver a specific webpage to the first computer.

As used herein, the term "response" shall mean the delivery of a specific webpage to a first computer from a second computer because of a request issued by the first computer to the second computer.

As used herein, the term "server side" shall mean those computers comprising the World Wide Web excluding those computer used to browse the World Wide Web.

As used herein, the term "service trigger" shall mean a prefetch trigger, activated by a change notice, which prefetches the webpage identified in the change notice.

As used herein, the term "timed trigger" shall mean a prefetch trigger, activated by a timing interval, which prefetches a webpage at a certain time or time interval.

As used herein, the term "timing interval" shall mean an interval of time between individual prefetch actions for a webpage.

As used herein, the term "prefetch trigger" shall mean a mechanism for prefetching a prefetched webpage.

As used herein, the term "user-requested webpage" shall mean a webpage that a user has requested and that the proxy obtains and forwards to the user.

As used herein, the term "webpage" shall mean a resource on the World Wide Web such as a webpage, a picture, a sound clip, or a data file.

As used herein, the term "web server" shall mean a computer that permanently stores a plurality of webpages.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
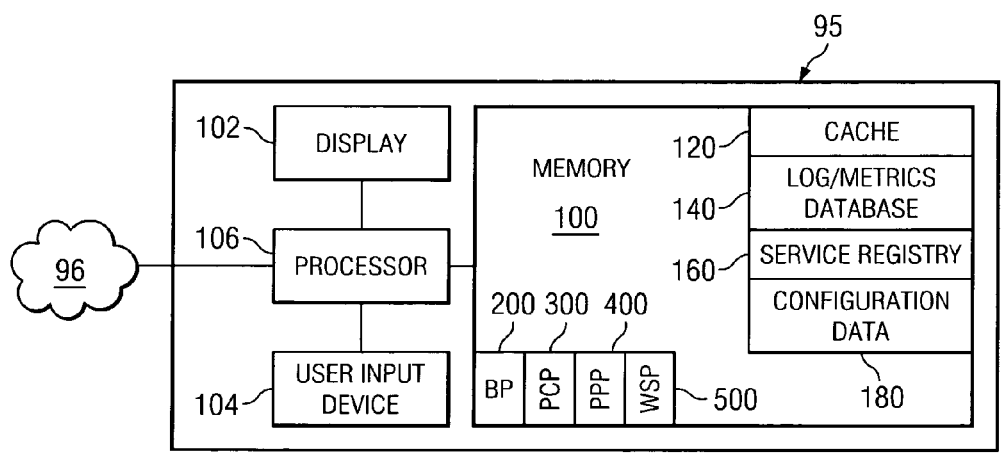
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Browser Program (BP) 200, Proxy Caching Program (PCP) 300, Proxy Prefetching Program (PPP) 400, and Web Server Program (WSP) 500. BP 200, PCP 300, PPP 400, and WSP 500 described herein can be stored within the memory of any computer depicted in FIG. 1. Alternatively, BP 200, PCP 300, PPP 400, and/or WSP 500 can be stored in an external storage device such as a removable disk, a CD-ROM, or a USB storage device. Memory 100 is illustrative of the memory within one of the computers of FIG. 1. Memory 100 also contains cache 120, log/metrics database 140, service registry 160, and configuration data 180. The present invention may interface with cache 120, log/metrics database 140, service registry 160, and configuration data 180 through memory 100. As part of the present invention, the memory 100 can be configured with BP 200, PCP 300, PPP 400, and/or WSP 500. Processor 106 can execute the instructions contained in BP 200, PCP 300, PPP 400, and/or WSP 500. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, BP 200, PCP 300, PPP 400, and/or WSP 500 can be stored in the memory of other computers. Storing BP 200, PCP 300, PPP 400, and/or WSP 500 in the memory of other computers allows the processor workload to be distributed across a plurality of processors instead of a single processor. Further configurations of BP 200, PCP 300, PPP 400, and/or WSP 500 across various memories are known by persons of ordinary skill in the art. The present invention may be a method, a stand alone computer program, or a plug-in to an existing computer program. For computer programs such as those described herein, persons of ordinary skill in the art are aware of how to configure the programs to plug into an existing computer program.

Figure 3:
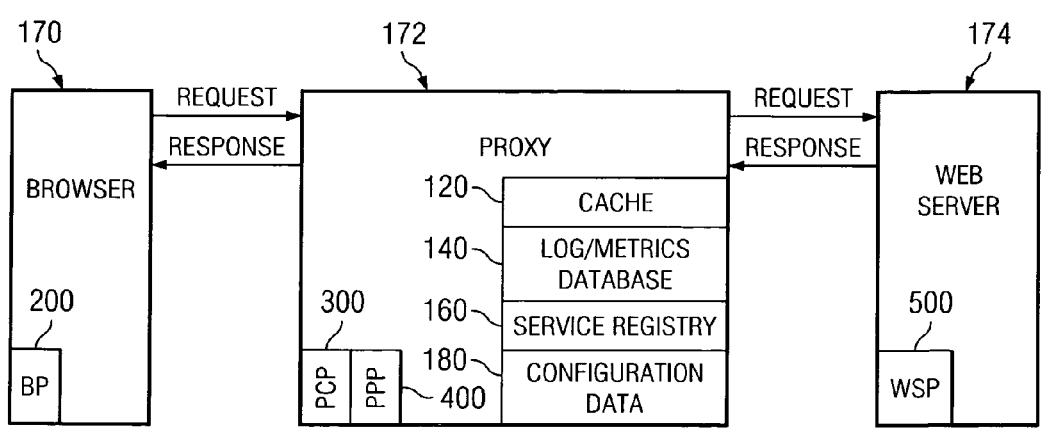
FIG. 3 is an illustration of the interaction of the browser, the proxy, and the web server of the present invention.

FIG. 3 illustrates the interaction of browser 170, proxy 172, and web server 174 of the present invention. Browser 170 operates on a user's computer and runs BP 200 to submit a request for a user-requested webpage to proxy 172. Proxy 172 runs PCP 300 when a request or a response is received. If the user-requested webpage is not in cache 120, proxy 172 forwards the request to web server 174. Web server 174 runs WSP 500 upon receipt of the request, obtains the webpage, and sends the user-requested webpage back to proxy 172. Web server 174 then returns the user-requested webpage to proxy 172. Proxy 172 forwards the user-requested webpage to browser 170 and runs PPP 400. PPP 400 prefetches additional webpages based on three triggers: a timed trigger, a service trigger, and an access based trigger. The timed trigger uses configuration data 180 to determine which webpages to prefetch. The service trigger uses service registry 160 to determine which webpages to prefetch. The access based trigger uses log/metrics database 140 to determine which webpages to prefetch. By sending the user-requested webpage to the user before requesting the prefetched webpages, the present invention is able to prefetch webpages without using the bandwidth between the user's computer and proxy 172, improving the overall time required for a user to request and receive a user-requested webpage.

Figure 4:
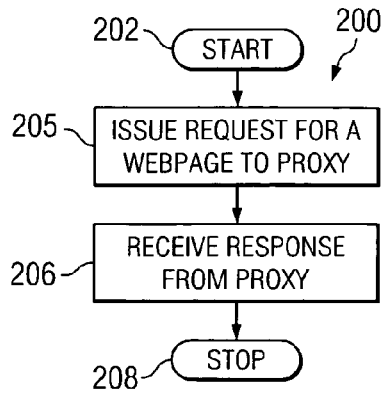
FIG. 4 is an illustration of the logic of the Browser Program (BP) of the present invention.

FIG. 4 illustrates the logic of Browser Program (BP) 200 of the present invention. BP 200 is a program that runs on browser 170 and interacts with proxy 172. BP 200 starts (202) whenever the user wants to browse the World Wide Web. BP 200 issues a request for a user-requested webpage to proxy 172 (204). BP 200 then receives the user-requested webpage from proxy 172 (206). BP 200 then ends (208).

Figure 5:
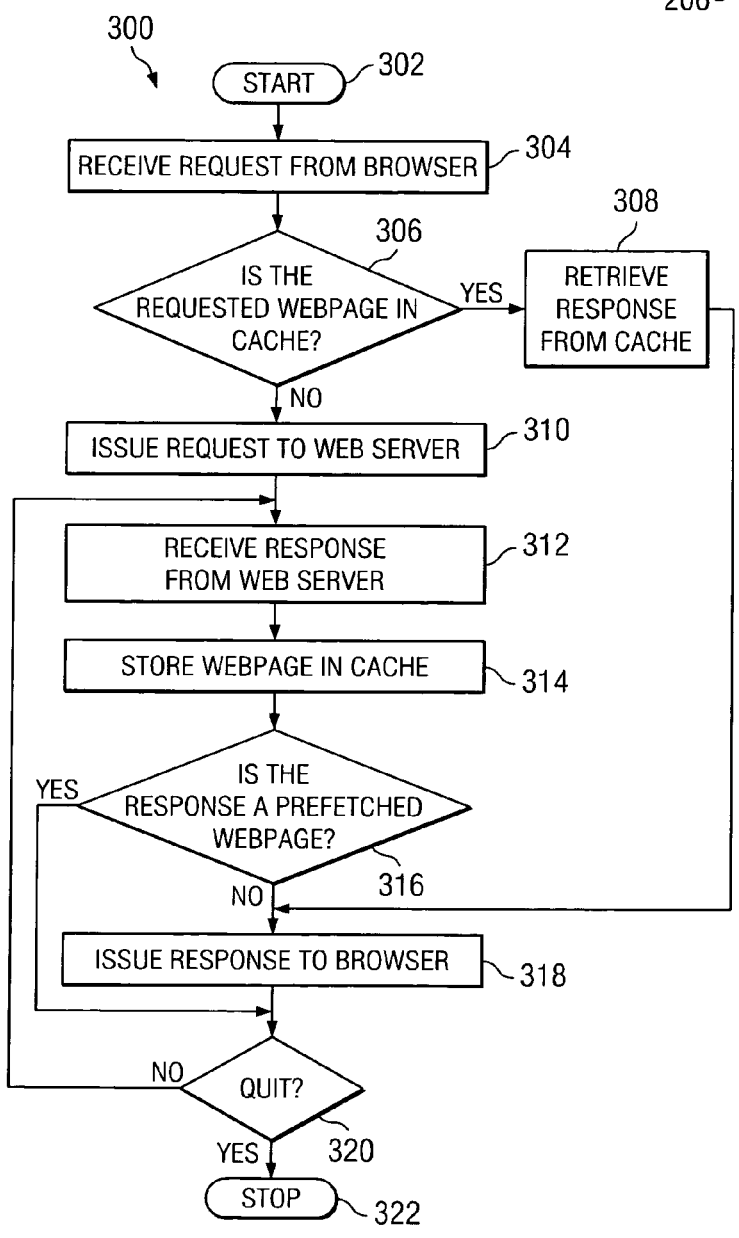
FIG. 5 is an illustration of the logic of the Proxy Caching Program (PCP) of the present invention.

FIG. 5 illustrates the logic of Proxy Caching Program (PCP) 300 of the present invention. PCP 300 is a program that prefetches webpages based on the expected request by the user. PCP 300 starts (302) when proxy 172 receives a request for a user-requested webpage from browser 170 (304). PCP 300 then determines whether the user-requested webpage is in cache 120 (306). If the user-requested webpage is in cache 120, PCP 300 retrieves the user-requested webpage from cache 120 (308) and proceeds to step 318. If the user-requested webpage is not in cache 120, PCP 300 issues a request for the user-requested webpage to web server 174 (310). After web server 174 processes the request, PCP 300 receives the webpage from web server 174 (312). The webpage received from web server 174 may be either a user-requested webpage or a prefetched webpage, depending on the type of webpage requested from web server 174. PCP 300 then stores the webpage received from web server 174 in cache 120 (314). PCP 300 then determines whether the response is a prefetched webpage (316). If the response is a prefetched webpage, PCP 300 proceeds to step 320. If the response is not a prefetched webpage, PCP 300 issues the response to browser 170 (318), then proceeds to step 320.

At step 320, PCP 300 determines whether to terminate the prefetching process (320). PCP 300 will quit the prefetching process if the user has requested another webpage or the proxy system administrator closes PCP 300. If PCP 300 determines that the prefetching process should not be terminated, PCP 300 returns to step 312. If PCP 300 determines that the prefetching process should be terminated, PCP 300 ends (322).

Figure 6:
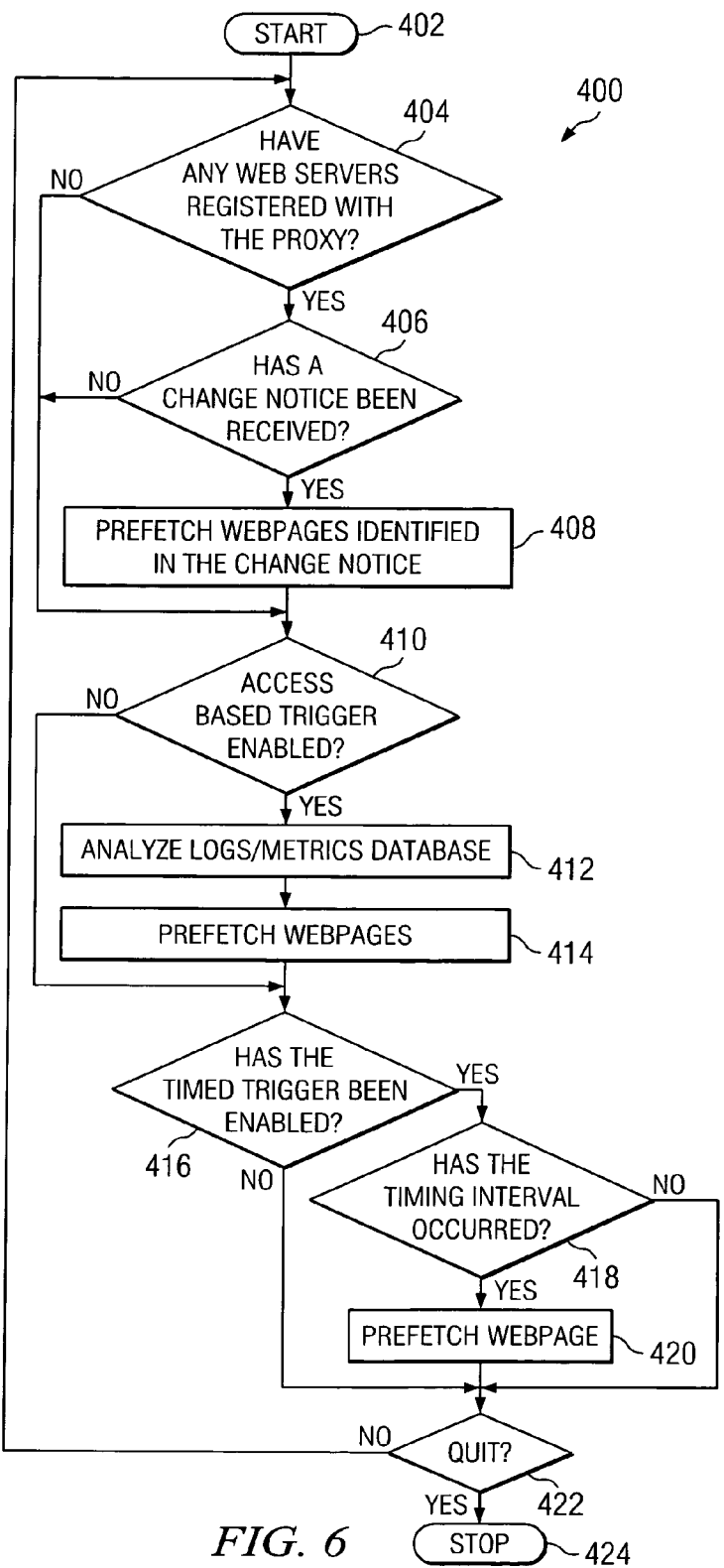
FIG. 6 is an illustration of the logic of the Proxy Prefetching Program (PPP) of the present invention.

FIG. 6 illustrates the logic of the Proxy Prefetching Program (PPP) 400. PPP 400 is a program that automatically prefetches webpages that users frequently request. PPP 400 starts (402) whenever proxy 172 boots up. PPP 400 then makes a determination whether any web servers 174 are registered with proxy 172 though service registry 160 (404). Service registry 160 is a service in which web server 174 notifies proxy 172 when a change has been made to any of the webpages stored on web server 174. If proxy 172 has stored all of the webpages in web server 174 in cache memory, then proxy 172 need only update the webpages in cache memory when the webpages are updated or otherwise modified. If no web servers 174 have registered with proxy 172 though service registry 160, then PPP 400 proceeds to step 410. If any web servers 174 have registered with proxy 172 though service registry 160, then PPP 400 determines whether proxy 172 has received a change notice from web server (406). If proxy 172 has not received a change notice from web server 174, then PPP 400 proceeds to step 410. If proxy 172 has received a change notice from web server 174, then PPP 400 prefetches the webpages identified in the change notice (408) and proceeds to step 410.

At step 410, PPP 400 determines whether the access based trigger has been enabled (410). The access based trigger is a prefetching trigger that prefetches webpages that meet a complex set of criteria in log/metrics database 140. Log/metrics database 140 comprises two parts: logs and metrics. The logs are web server's 174 access logs and application logs. The access logs and application logs are computer files that record every request coming into web-server 174. Metrics are tools that analyze web server's 174 usage, behavior, and access patterns. Metrics also provide important measurements for increasing the performance and usability of a webpage. Metrics may be created by data mining techniques into the logs. Software engineers create logs and metric analysis algorithms to understand how data is accessed on web server 174. Log and metric analysis algorithms are also used to increase the understanding of the user access patterns. Thus, the log and metric analysis algorithms define specific webpages that will be heavily requested and, therefore, should be prefetched. For example, during an election day, log/metrics database 140 recognizes that the users will frequently request the election results webpages. If the voting polls are updated every thirty minutes during a presidential campaign, then log/metrics database 140 caches the election webpage every thirty minutes, i.e. after the election webpage has been updated. By only caching the election webpage when the election webpage is updated, log/metrics database 140 does not unnecessarily request the election webpage from web server 174. If at step 410 PPP 400 determines that the access based trigger has not been enabled, then PPP 400 proceeds to step 416. If PPP 400 determines that the access based trigger has been enabled, then PPP 400 analyzes the log/metrics database 140 within proxy 172 (412). PPP 400 then prefetches the webpages identified in log/metrics database 140 (414) and proceeds to step 416.

At step 416, PPP 400 determines whether the timed trigger has been enabled (416). The timed trigger is a prefetching trigger that prefetches webpages at a predetermined time according to configuration data 180. Configuration data 180 analyzes user access patterns on particular webpages and instructs proxy 172 to prefetch the webpages before heavy request periods. Thus, configuration data 180 states what particular time proxy 172 should prefetch a specific webpage. Alternatively, the particular time can be invoked using webpage scripts. As an example, configuration data 180 may determine that THE DALLAS MORNING NEWS® home webpage is frequently requested at 8 am, noon, and 6 pm. Configuration data 180 would then instruct proxy 172 to prefetch THE DALLAS MORNING NEWS® home webpage at 8 am, noon, and 6 pm. Prefetching the heavily requested webpage just prior to a heavy request time allows the present invention to provide webpages to users faster than the prior art methods.

If at step 416, PPP 400 determines that the timed trigger has not been enabled, PPP 400 proceeds to step 422. If PPP 400 determines that the time trigger has been enabled, PPP 400 determines if the timing interval has occurred (418). In other words, PPP 400 determines whether the particular time for prefetching a webpage identified in configuration data 180 has occurred. If the timing interval has not occurred, PPP 400 proceeds to step 422. If the timing interval has not occurred, PPP 400 prefetches the webpage identified in configuration data 180 (420) and proceeds to step 422. At step 422, PPP 400 determines whether to continue running PPP 400 (422). PPP 400 will continue running unless the system administrator has indicated a desire to end PPP 400. If the system administrator has not indicated a desire to quit, then PPP 400 returns to step 404. If the system administrator has indicated a desire to quit, then PPP 400 ends (424).

The prefetching process illustrated above is only one embodiment of PPP 400. The three triggers illustrated in PPP 400 will most likely occur for a plurality of web servers 174. Additionally, the three triggers may be separated from each other so that one trigger prefetches webpages from one web server 174 and another trigger prefetches webpages from a different web server 174. Persons of ordinary skill in the art will appreciate that different permutations of the three triggers described herein can be created to form combination triggers for individual web servers 174.

Figure 7:
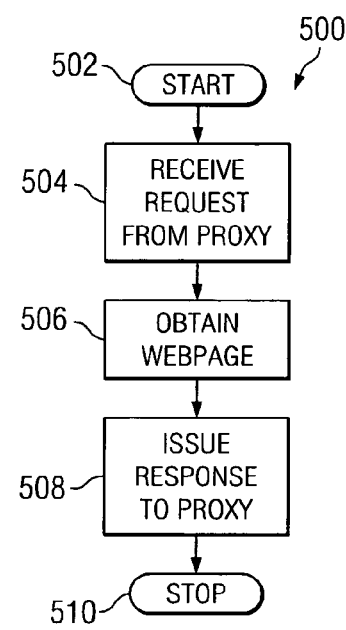
FIG. 7 is an illustration of the logic of the Web Server Program (WSP) of the present invention.

FIG. 7 illustrates the logic of Web Server Program (WSP) 500. WSP 500 is a program that obtains webpages requested by proxy 172. WSP 500 starts (502) when web server 174 receives a request from proxy 172 (504). WSP 500 obtains the webpage from the host server (506). WSP 500 then issues the response to proxy 172 comprising the user-requested webpage (508) and ends (510).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method of delivering a webpage to a user responsive to a user request, the method comprising:
   a proxy subscribing to a subscription service of a web server, wherein the web server notifies the proxy when a change is made to the webpage;
   the web server determining whether a change has been made to the webpage;
   responsive to the web server determining that a change has been made to the webpage, the web server sending a change notice to the proxy;
   responsive to receiving the change notice, the proxy prefetching the webpage from the web server and storing the webpage in a cache memory of the proxy, wherein the webpage has not been requested by the user;
   the user making a request to the proxy to retrieve the webpage; and
   responsive to receiving the request, the proxy retrieving the webpage from the cache memory of the proxy and delivering the webpage to the user.

2. The method of claim 1, further comprising:
   the proxy maintaining a log of every request made by a plurality of users to the web server for the webpage;
   the proxy analyzing the log to determine a time period when the webpage is frequently requested by the plurality of users; and
   responsive to determining the time period, the proxy prefetching the webpage from the web server and storing the webpage in the cache memory of the proxy at a time before the time period begins, wherein the webpage has not been requested by the user.

3. The method of claim 2, further comprising:
   the proxy determining a timing interval for prefetching the webpage from the web server; and
   responsive to determining that the timing interval has occurred, the proxy prefetching the webpage from the web server and storing the webpage in the cache memory of the proxy, wherein the webpage has not been requested by the user.

* * * * *